455/3

May 18, 1954 J. R. NORRIS 2,678,999

PORTABLE RADIO

Filed Aug. 8, 1949 2 Sheets-Sheet 1

INVENTOR.
JOHN R. NORRIS
BY Herbert E. Metcalf
ATTORNEY

May 18, 1954 J. R. NORRIS 2,678,999

PORTABLE RADIO

Filed Aug. 8, 1949 2 Sheets-Sheet 2

INVENTOR.
JOHN R. NORRIS
BY Herbert E. Metcalf
ATTORNEY

UNITED STATES PATENT OFFICE 2,678,999

PORTABLE RADIO

John R. Norris, Compton, Calif.

Application August 8, 1949, Serial No. 109,111

1 Claim. (Cl. 250—14)

My invention relates to radio receivers of the portable type, and more particularly to a portable radio receiver in the form of a headset adapted to be worn by a listener. The present invention is particularly useful in the operation of individual radio receivers under conditions enabling coin payment for a choice of several radio programs, with reception confined to the individual.

The common form of portable radio broadcast receiver in use today is a device usually carried in the hand or by means of shoulder straps, and providing a loudspeaker output. In some cases such portable receivers can be provided with individual earphones to confine the sound output of the receiver to the individual user. Such arrangements are bulky and are hard to use.

Individual coin operated radio receivers are now in use where the radio receiver is of the loud speaking type and where the transmitters are the standard commercial broadcasting stations. However, where a number of individuals closely associated desire to listen to such radio programs as they may select, without disturbing others of the group, individual coin operated receivers of the types presently known have not been found satisfactory.

Among the objects of the present invention are:

To provide a light portable and unitary radio receiver adapted to be worn by an individual with the sound output thereof substantially confined to the wearer.

To provide a portable radio receiver in the form of a headset.

To provide a light individual receiver operating from a local multi-channel transmitter under coin control.

To provide a complete multi-channel coin controlled radio receiver in the form of an individual headset.

To provide a headset radio receiver wherein the headband of the headset is used as an antenna.

To provide a local master radio receiver rebroadcasting to a plurality of individual headset receivers; and To provide a relatively simple coin controlled radio receiver suitable for individual use in trains, busses, and airplanes, for example.

In brief, my invention includes individual radio receivers in the form of a headset having an earphone attached to a headband, this headband supporting a radio receiver and acting as an antenna for the supported receiver. The entire unit is self-contained and is worn by the listener without additional wires or connections. Preferably the receiver is tunable to a number of channels and is provided with a volume control. Batteries are also mounted on the headband of the instrument and preferably placed under the control of a coin controlled timer, likewise mounted on the headband. In the preferred device, the end result is an individual headset receiver with channel selection, volume control, and coin controlled tuning mechanism.

As one of the main uses of the individual radio receiver of the present invention is for the reception of radio broadcast programs within moving vehicles, I may utilize a master long range radio receiver on the vehicle which receives a number of channels from commercial broadcast stations and then rebroadcasts the received programs inside of the vehicle on higher or lower frequencies for local individual reception only by the wearers of the headset receivers of the present invention.

By invention may be more fully understood by reference to the drawings which illustrate one preferred form my invention may take.

While my invention can, under certain conditions of short range, be utilized to receive programs directly from commercial broadcast stations, I prefer when any substantial range is involved to utilize a master receiver-transmitter that is able, for example, to receive programs directly from commercial radio stations and then retransmit such programs, preferably on lower or higher frequencies to a plurality of relatively closely grouped local receivers. Such an arrangement is advisable, for example, for use on moving vehicles such as trains, busses and airplanes or the like, where the occupants of the vehicle desire to listen individually to the programs as broadcast from commercial stations, without disturbance of other nearby passengers.

Figure 1:
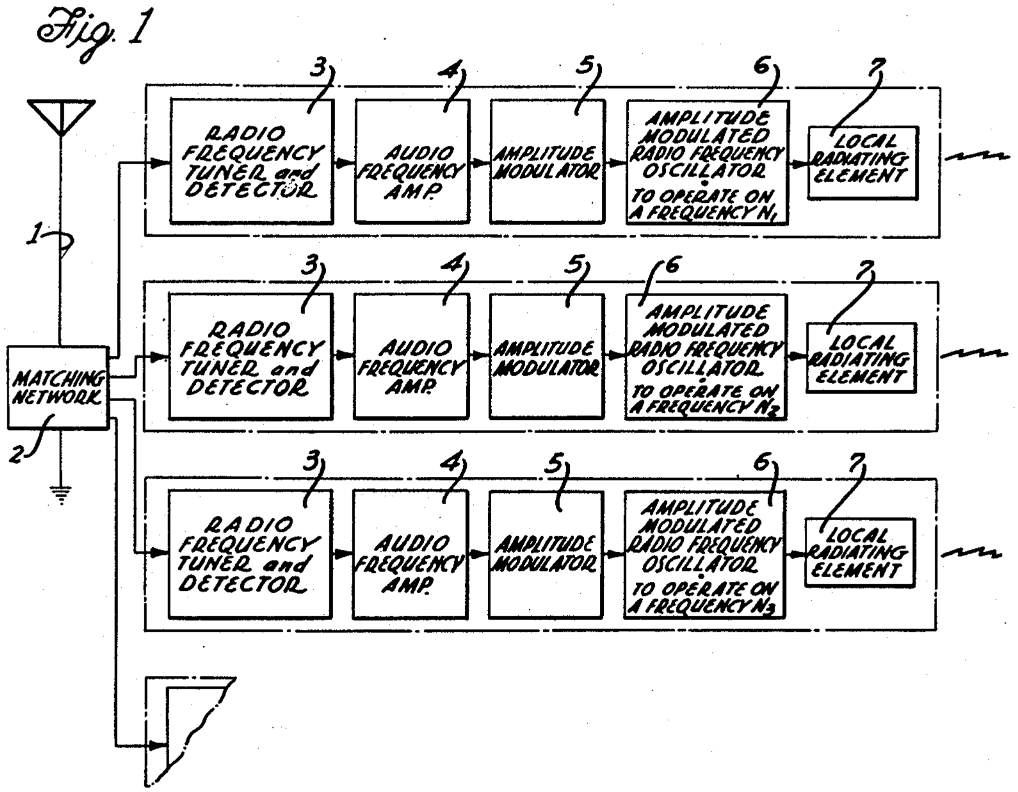
Figure 1 is a block diagram of a multi-channel broadcast receiver-local transmitter.

A receiver-transmitter suitable for use in a vehicle, for example, is shown in block diagram in Figure 1. Here a main antenna 1 is connected to a matching network 2 so that a plurality of radio frequency tuners and detectors 3 can be energized, and tuned to different program channels of such commercial broadcast stations as may be within range. Only four channels are indicated in Figure 1, but more may be used if desired.

The radio frequency and detector unit 3 of each channel feeds an audio frequency amplifier 4 which in turn feeds on amplitude modulator 5. Each amplitude modulator 5 controls an amplitude modulated *radio frequency oscillator* 6, these oscillators all operating on different, preferably high, or very high frequencies N of relatively low power. Each of the radio frequency oscillators 6 is connected to a local radiating element 7 adapted to radiate substantially only within the passenger compartment of the vehicle.

Figure 3:
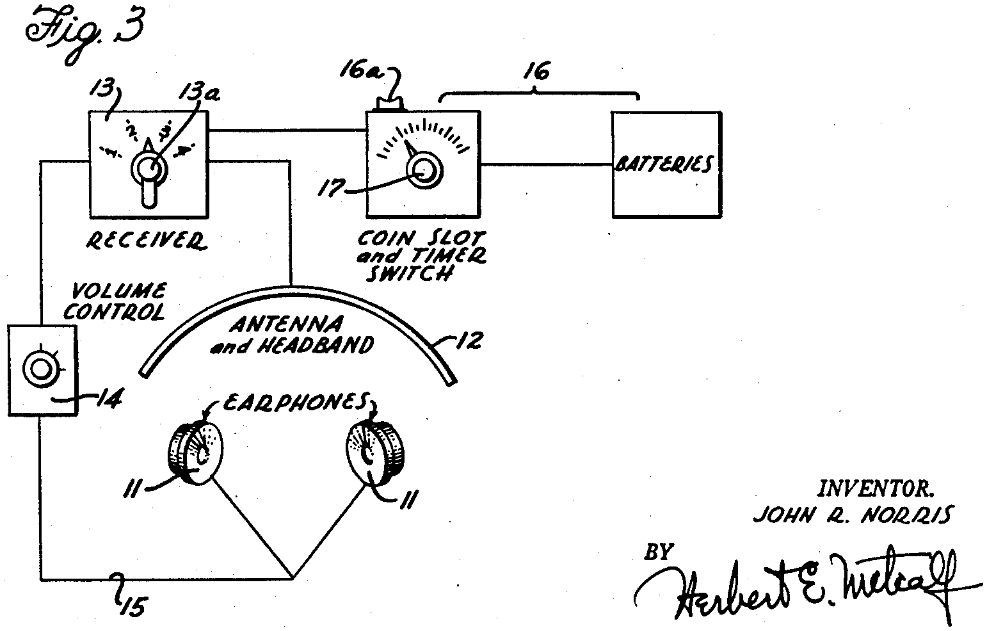
Figure 3 is a circuit block diagram of a headset receiver according to the present invention.
Figure 2:
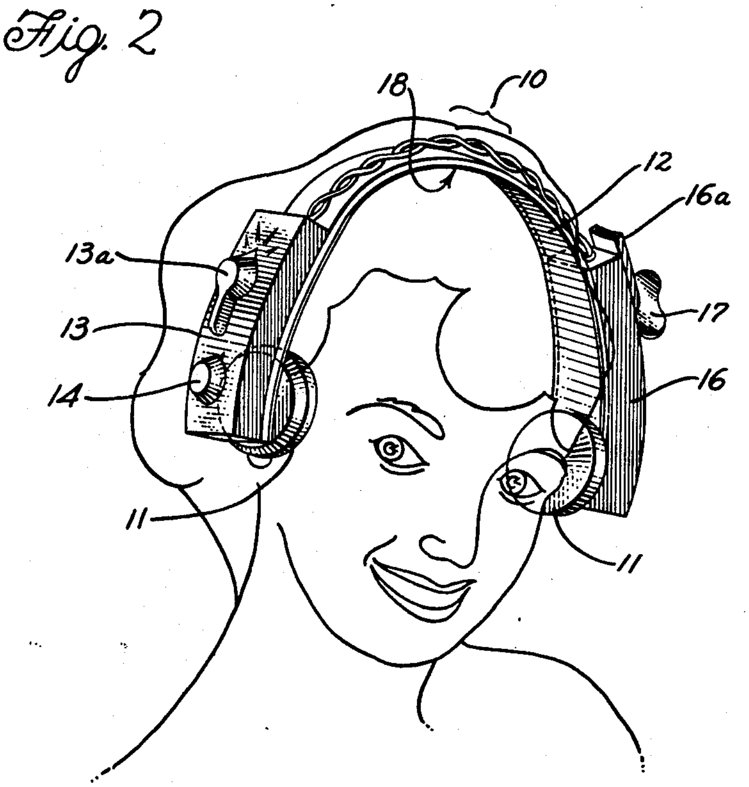
Fig. 2 is a perspective view of an assembled multi-channel coin controlled headset receiver having a circuit as shown in Figure 3 shown on a wearer in phantom view.

The passengers of the vehicle, when they desire to listen to radio programs, are each provided with a unitary and individual, preferably coin-operated, radio receiver 10 as shown assembled, and in use in Figure 2 and in block assembly diagram in Figure 3.

The receiver 10 is in the form of a headset having one or preferably a pair of earphones 11 attached to, but insulated from a flexible conductive headband 12. The headband 12 is of the usual U-shaped type passing over the head of the user and shaped to place the earphones against the ears of the user, as shown clearly in Figure 2. On one side of the headband, mounted thereon but insulated therefrom, is a radio set 13 having a channel selector 13*a* built therein, and a volume control 14 in the output 15 thereof, this output being connected to earphones 11. On the other side of the headband 12, mounted thereon and also insulated therefrom is a combined battery box and coin timer switch 16, the latter preferably being of the well-known simple spring clock type such as are commonly used in automobile parking meters. The coins are inserted through a slot 16*a* and the time is set up by turning a timing knob 17. Turning of knob 17 connects the batteries in box 16 to the receiving set 13, and when the spring clock has run down, the current to the receiving set is shut off.

One of the features of the present invention is the use of the headband 12 as an antenna for the receiver 13, connected as shown in Figure 3. For very high frequencies I may prefer to electrically divide the headband at the top of the head, and connect the two halves to the receiving set as a dipole. In any event, I prefer to space the radio set 13 and the battery box-timer case 16 to leave a flexible portion 18 of the headhand therebetween, to insure adequate fit of the device on the head of the wearer.

The unitary individual receiver as above described is ideal in that any one of a group of persons is individually able to listen to a favorite radio program without disturbing others, and meanwhile is able to move about at will. The device of the present invention is, of course, fully operative without the coin control feature for use in hospitals, sanitaria and the like, where individual listening is desirable without the disturbance of adjacent persons. Furthermore, when commercial radio broadcast stations are close and powerful, the device is suitable for direct pickup from these stations for use, for example, at beaches, or in other locations where loudspeaking equipment would not be desirable.

However, the use of a local radiating element permits lower gain receivers with consequent reduction in weight.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claim.

I claim:

A radio receiver comprising a conductive arcuate relatively wide thin resilient headband shaped to extend from the vicinity of one ear over the top of the head to the vicinity of the other ear of a human user, said headband having a first wide surface adapted to come into contiguous relationship with the head of the user and a second wide surface opposite said first surface and parallel thereto, a sound reproducer secured to said first surface at one end of said headband and disposed between said first surface and the ear of said human user, a radio receiver capable of operation from batteries and including a volume control knob and a tuning knob, a casing for said radio receiver, means securing said casing to said second surface of said headband adjacent said one end thereof and in maximum proximity to said sound reproducer, said receiver having an input circuit, said headband being connected to said input circuit and serving as the antenna for said radio receiver, a battery case containing batteries for supplying operating power to said radio receiver, means securing said battery case to said second surface at the end of said headband adjacent the other ear of said user and a power cord extending from said battery case to said radio receiver in continuous proximity with said headband.

References Cited in the file of this patent

UNITED STATES PATENTS

| Number | Name | Date |
|---|---|---|
| 1,676,252 | Coxhead | July 10, 1928 |
| 1,695,172 | Clement | Dec. 11, 1928 |
| 1,799,056 | Miller et al. | Mar. 31, 1931 |
| 1,840,013 | Benson | Jan. 5, 1932 |
| 1,935,982 | Mills | Nov. 21, 1933 |
| 2,008,280 | Hopkins | July 16, 1935 |
| 2,101,033 | Mashbir | Dec. 7, 1937 |
| 2,394,444 | Halstead | Feb. 5, 1946 |
| 2,470,687 | Cafrella | May 17, 1949 |
| 2,554,270 | Rosenberg | May 22, 1951 |

OTHER REFERENCES

Radio Electronics, June 1949, pages 32 and 33.